May 28, 1968  A. EISELE  3,384,969

INTERNAL SPACING MEASUREMENT GAUGE

Filed July 18, 1966  2 Sheets-Sheet 1

May 28, 1968     A. EISELE     3,384,969

INTERNAL SPACING MEASUREMENT GAUGE

Filed July 18, 1966     2 Sheets-Sheet 2

INVENTOR
ANDREW EISELE

BY *Barthel & Bugbee*

ATTORNEYS 3,384,969
INTERNAL SPACING MEASUREMENT GAUGE
Andrew Eisele, 20460 Brookwood Ave.,
Dearborn Heights, Mich. 48127
Filed July 18, 1966, Ser. No. 565,986
10 Claims. (Cl. 33—147)

ABSTRACT OF THE DISCLOSURE

This dial indicator precision bore gauge measures the separation or spacing of internal shoulders or grooves which are difficult of access by ordinary gauges, by means of feelers or measuring pins which are also movable transversely to retract them into the gauge body or stem in order to enable free insertion and removal of the stem from the bore, one of the feelers being also movable longitudinally or axially to measure the separation of the internal shoulders or grooves, with its motion transmitted to a dial indicator. In this manner the present gauge measures the departure from the desired or standard separation or spacing of the internal shoulders or grooves, such grooves being employed, within bores, for the reception of snap rings or for other purposes.

Figure 1:
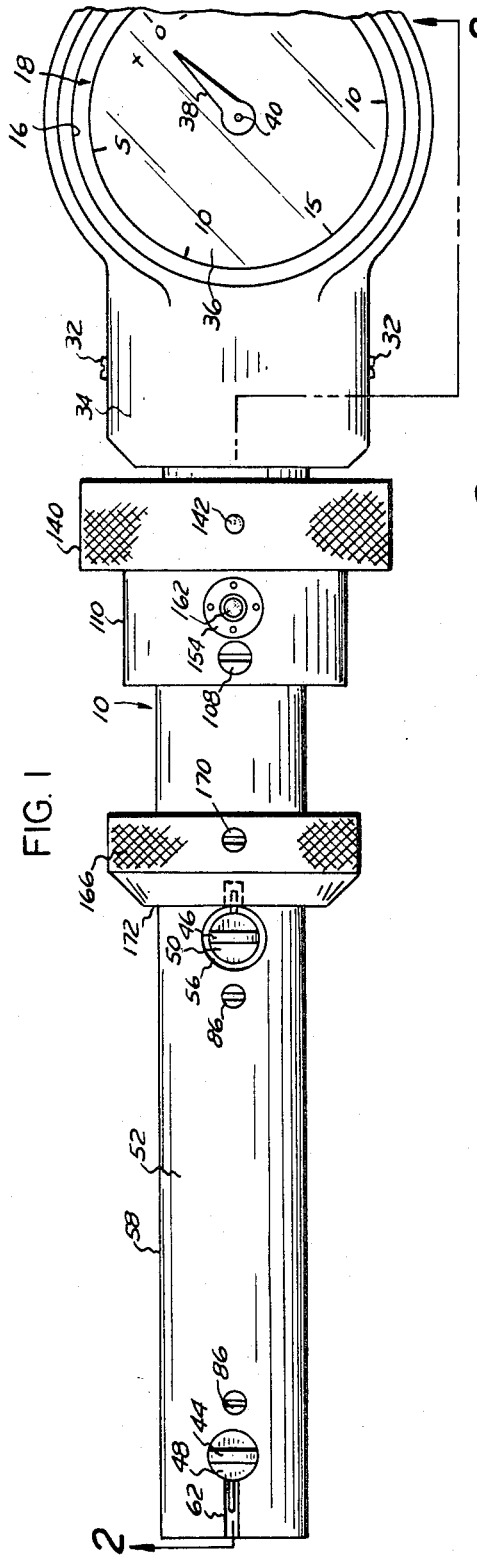
Figure 2:
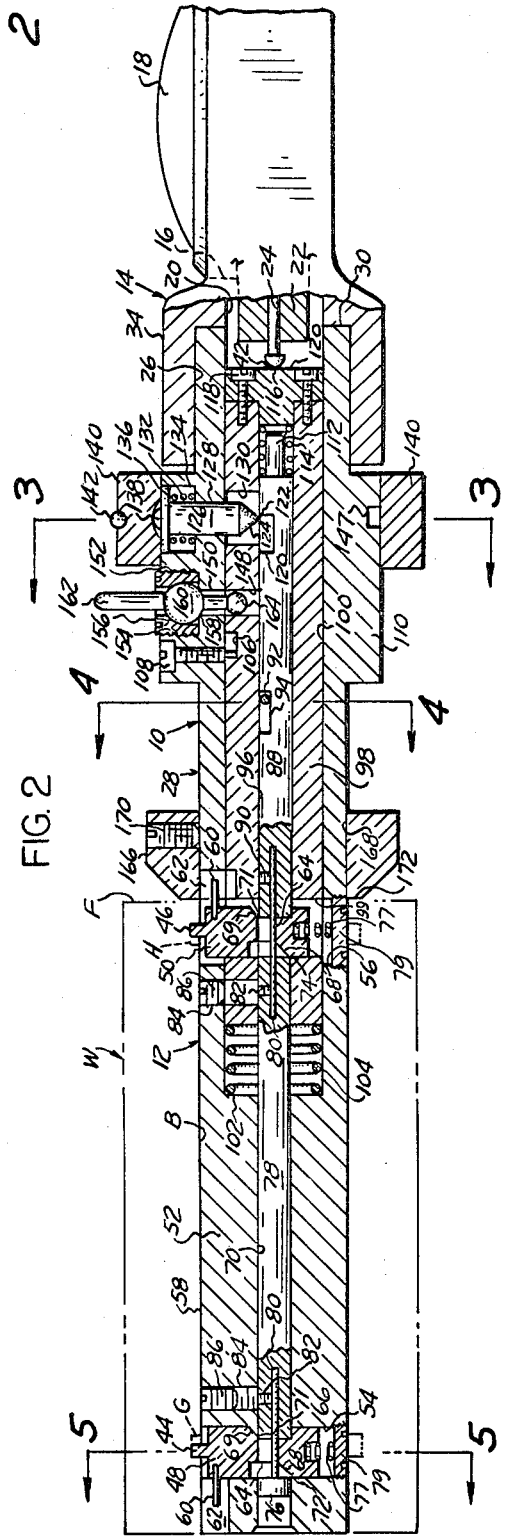
Figure 3:
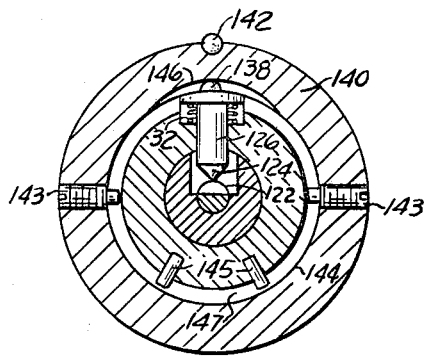
Figure 4:
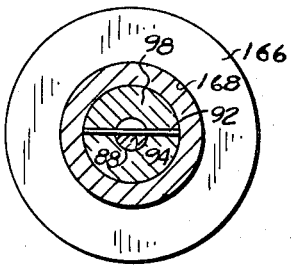
Figure 5:
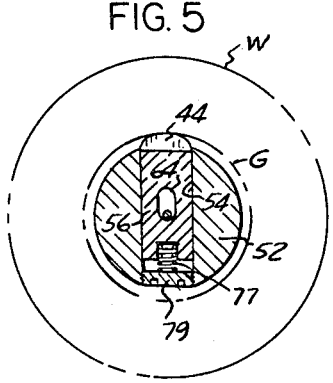

In the drawings:

FIGURE 1 is a top plan view of an internal spacing measurement gauge, according to one form of the invention, with the rearward end of the gauge and a portion of the dial indicator omitted to conserve space;

FIGURE 2 is a central vertical section, partly in side elevation, taken along the line 2—2 in FIGURE 1; and FIGURES 3, 4 and 5 are cross sections taken respectively along the line 3—3, 4—4, and 5—5 in FIGURE 2.

Referring to the drawings in detail, FIGURES 1 and 2 show an internal spacing measurement gauge, generally designated 10, as including a hollow measuring head, generally designated 12, upon which is mounted a hollow handle or dial indicator holder 14 provided with a cup-shaped cavity or recess 16 containing a conventional dial indicator 18. The handle 14 is also provided with a bore 20 through which the stem 22 of the dial indicator 18 and the plunger 24 thereof project into the interior of the instrument 10. The handle 14 also has a counterbore 26 which snugly receives the rearward end of the elongated tubular body 28 of the gauge 10 against an annular shoulder 30, radial screws 32 being threaded through the handle portion 34 in order to removably secure the rearward end of the gauge body 28 in the counterbore 16. The dial indicator 18 is provided with the usual graduated dial 36 with which registers the ordinary needle or pointer 38 mounted on the shaft 40 which is connected to the plunger 24 by motion-amplifying mechanism (not shown) so that the needle 38 swings in a circular path relatively to the graduated dial 36 in response to motion impressed upon the rounded enlarged outer end 42 of the dial indicator plunger 24.

The motion which eventually causes reciprocation of the dial indicator plunger 24 is brought about by the relative axial or longitudinal motion between the tips 44 and 46 of forward and rearward feelers or measuring pins 48 and 50 which are mounted for radial or transverse motion relatively to the forward or pilot portion 52 of the gauge body 28 in transverse bores 54 and 56 disposed in axially-spaced parallel relationship within the pilot portion 52. The latter has a cylindrical outer surface 58 which substantially fits the bore B of the workpiece W in which it is inserted, in order to measure the separation or spacing of forward and rearward internal grooves G and H respectively (FIGURE 2). The transverse bore 54 for the forward measuring pin 48 snugly but slidably receives the latter whereas the transverse bore 56 for the rearward measuring pin 50 is larger than the diameter of the measuring pin 50 so as to permit the latter to move longitudinally or axially therein relatively to the forward measuring pin 48 so as to measure the separations of the forward and rearward grooves G and H on the dial indicator 18.

Seated in each of the measuring pins 48 and 50 is an axially-directed guide pin 60 which is slidable in a radial guide slot 62 in the pilot portion 52 of the gauge body 28. These pins 60 and slots 62 prevent rotation of the measuring pins or feelers 48 and 50. Each measuring pin 48 intermediate its opposite ends (FIGURE 5) is provided with an elongated slot 64 in a narrowed neck portion 66 containing forward and rearward inclined or beveled cam surfaces 68 and 69 respectively. Each cam surface 68, which is inclined relatively to the axis of the pilot portion 52 and to the axis of a central inner longitudinal bore 70 coaxial with the cylindrical outer surface 58 of the pilot portion 52 is engaged by a sharp annular edge 72 or 74, the former being located on the rearward end of a button 76 reciprocable in the forward end of the longitudinal bore 70 whereas the latter is located on the rearward end of a forward motion-transmitting rod 78 (FIGURE 2). The inner ends of the measuring pins 48 and 50 are recessed to receive compression springs 77, and the bores 54 and 56 are threaded to receive screw closure plugs 79 which the springs 77 engage.

Extending rearwardly from the button 76 and forward motion-transmitting rod 78 are stems 80 seated in the forward and rearward ends respectively of the forward motion-transmitting rod 78 and locked therein by set screws 82 reached by radial threaded access holes 84 closed by threaded plugs 86. The rearward end of the rearward stem 80 is seated in the forward end of a rearward motion-transmitting rod 88 (FIGURE 2) and held therein by a set screw 90. The rearward cam surfaces 69 are engaged by the sharp-edged ends 71 of the forward and rearward motion-transmitting rods 78 and 88 when these rods are moved to the left or forward in FIGURE 2. Longitudinal motion of the forward and rearward motion-transmitting rods 78 and 88 is limited by a chordal pin 92 registering with the flat bottom and opposite ends of an elongated notch or groove 94 in the rearward motion-transmitting rod 88 (FIGURE 4), thereby also preventing rotation of the motion-transmitting rods 78 and 88 in their respective bores 70 and 96.

The longitudinal bore 96 is located within a tubular outer motion-transmitting member 98 (FIGURE 2) which is drilled diametrically (FIGURE 4) to receive the opposite ends of the pin 92 and also has an enlarged transverse hole 99 therethrough for the passage of the rearward measuring pin 50. The outer motion-transmitting member 98 in turn is reciprocably mounted in an outer bore 100 which is coaxial with the inner longitudinal bore 70 and in effect constitutes a counterbore thereof with an annular shoulder 102 therebetween (FIGURE 2). Mounted in the forward end of the outer bore 100 is a helical compression spring 104 which engages the annular shoulder 102 and the forward end of the outer motion-transmitting member 98 to urge the forward wall of its tranverse hole 99 normally in a rearward direction against the rearward measuring pin 50. The outer motion-transmitting member 98 is provided with an elongated notch or slot 106 engaged by the inner end of a screw 108 threaded radially through an intermediate enlargement 110 of the gauge body 28, thereby limiting the recpirocation of the outer motion-transmitting member 98 as well as preventing rotation thereof.

The rearward end portion of the rearward motion-transmitting rod 88 is of reduced diameter as at 112, and is encircled by a helical compression spring 114 which abuts the forward end of a hardened steel plug 116 secured by screws 118 to the rearward end of the outer motion-transmitting member 98 so as to travel unitarily therewith. The rearward face 120 of the plug 116 engages the rounded end 42 of the dial indicator plunger 24.

In order to manually retract the interconnected motion-transmitting rods 78 and 88 and consequently retract the measuring pins 48 and 50 into the pilot portion 52 for safe insertion or removal of the latter relatively to the bore B of the workpiece W, the rearward motion-transmitting rod 88 is provided with a rearward notch 120 (FIGURES 2 and 3) having a sharp rearward edge 122 which is engaged by the conical tip 124 of a plunger 126. The latter is reciprocably mounted in a radial bore 128 in the intermediate enlargement 110 of the gauge body 28 and extends through the enlarged hole 130 in the tubular outer motion-transmitting member 98 to the sharp edge 122. The plunger 126 is urged outward by a compression spring 132 mounted in a counterbore 134 and engages an enlargement or flange 136 near the upper end of the plunger 126, which terminates in a rounded upper end 138.

Rotatably mounted on the intermediate enlargement 110 of the gauge body 28 (FIGURES 2 and 3) is a knurled operating ring 140 in which is seated a position-indicating bead 142 immediately above the rounded plunger end 138. The ring 140 is provided with a bore 144 which snugly but rotatably engages the intermediate enlargement 110 throughout most of its extent, except at its portion lying radially inward of the position-indicating bead 142, where it is provided with an arcuate recess 146 of smaller radius of curvature than the bore 144. This recess 146 of the bore 144 provides a clearance or relief in the bore 144 which receives the rounded upper end 138 of the plunger 126 when urged upward by the compression spring 132 (FIGURE 3) so that the conical lower end 124 of the plunger 126 is substantially withdrawn from operative engagement with the sharp edge 122 of the notch 120, permitting the interconnected motion-transmitting rods 78 and 88 to be pushed to the left (FIGURE 2) by the compression spring 114, whereupon their sharp-edged forward ends 71 acting against the rearward inclined cam surfaces 69 push the forward and rearward feelers or measuring pins 48 and 50 radially outward so that their arcuate tips 44 and 46 enter their respective grooves G and H in the workpiece W. Rotation of the knurled ring 140 to bring the bore 144 into engagement with the rounded outer end 138 of the plunger 126 causes the plunger 126 and its conical tip 124 to move radially inward against the sharp edge 122 (FIGURE 2), consequently shifting the motion-transmitting rods 78 and 88 rearwardly or to the right in FIGURE 2, thereby causing the sharp edges 72 and 74 to engage the forward cam surfaces 68 and retract the measuring pins 48 and 50 into their respective bores 54 and 56 within the pilot portion 52 of the gauge body 28. The rotation of the ring 140 (FIGURE 3) is limited by the action of two radial stop screws 143 threaded therethrough with their inner ends projecting inward into engageability with the outer ends of two radial stop pins 145 seated in the gauge body enlargement 110 and projecting outward into an annular groove 147 therein.

The tubular outer motion-transmitting member 98 between the notch 106 and the hole 130 is provided with a radial hole 148 which is aligned with a radial hole 150 in the gauge body 28, the hole 150 opening into a threaded counterbore 152 closed by a centrally-bored threaded plug 154 containing a ball socket 156. The outer end of the hole 150 is provided with a corresponding annular ball seat 158. Mounted between the ball socket 156 and the ball seat 158 is the pivot ball 160 of a hand lever 162, the lower end of which terminates in a contact ball 164 which engages the side wall of the hole 148. As a consequence, when the hand lever 162 is rocked in a rearward direction around its ball pivot 160, its ball end 164 moves the tubular outer motion-transmitting member 98 forwardly or to the left in FIGURE 2, carrying with it the rearward measuring pin or feeler 50 and compressing the spring 104.

The depth of penetration of the pilot portion 52 is regulated by the position of a knurled stop collar 166 which has a central bore 168 snugly but slidably fitting the outer surface 58 of the pilot portion 52 of the gauge body 28. The stop collar 166 is drilled and threaded radially to receive a headless set screw 170 by which it may be clamped in any desired position between the rearward bore 56 and the gauge body enlargement 110. When so clamped, the front face 172 of the stop collar 166 engages the front face F of the workpiece W surrounding the bore B to prevent further insertion of the pilot portion 52.

The operation of the internal spacing measurement gauge 10 in measuring the spacing or separation of the grooves G and H within the bore B, or their departure from a specified or standard spacing, is believed to have been indicated in a general way during the foregoing description of its construction. Assuming that the inspector has been informed as to the standard distance of the groove H from the outer face F of the workpiece W, he sets the stop collar 166 at the required distance from the tip 46 of the rearward measuring pin 50 to correspond to the distance of the groove H from the front face F and clamps the stop collar 166 in that position by means of the set screw 170. He then rotates the knurled ring 140 to the right or left (FIGURE 3) so that the indentation 146 passes beyond the rounded outer end 138 of the plunger 126 and the bore 144 engages the end 138. This action forces the conical tip 144 of the plunger 126 to move inward against the sharp edge 122 of the rearward motion-transmitting rod 88 moving it and the forward rod 78 to the right and consequently moving the feelers 48 and 50 radially inward by the action of the sharp edges 72 and 74 against the cam surfaces 68 of the measuring pins 48 and 50. The pilot portion 52 of the gauge is then inserted into the bore B as far as it will go, as determined by the stop collar 166, causing the tips 44 and 46 of the feelers 48 and 50 to arrive in registry with the workpiece grooves G and H. This registry is assisted by swinging the hand lever 162 around its pivot ball 169 in a clockwise direction to move the outer motion-transmitting member 98 to the left (FIGURE 2) against the thrust of the spring 104 and thus move the adjacent feeler 50 to the left.

The operator now rotates the ring 140 until the indicator bead 142 arrives in line with the lever 162, whereupon the plunger 126 is moved radially outward by the compression spring 132, thereby permitting the compression spring 114 to shift the motion-transmitting rods 78 and 88 to the left causing their sharp edges 71 to act against the inclined rearward cam surfaces 69 to push the feelers or measuring pins 48 and 50 outward into the grooves G and H, assisted by their respective compression springs 77. Assuming that the operator has pushed the pilot portion 52 inward a sufficient distance to cause the tip 44 of the forward measuring pin 48 to engage the further side of the inner groove G, the compression spring 102 pushes the tubular outer motion-transmitting rod 98 and the rearward measuring pin 50 to the right until the tip 46 engages the nearer shoulder of the outer groove H as shown in FIGURE 2. Any deviation from the standard separation of these two annular shoulders forming the mutually-remote sides of the grooves G and H is immediately indicated by the needle 38 of the dial indicator 18 upon the graduated dial 36 by reason of the motion of the end surface 120 of the hardened steel plug 116 against the rounded end 42 of the dial indicator plunger 24.

After the operator has recorded or otherwise taken action on the measurement thus indicated, he again rotates the knurled ring 140 to retract the measuring pins 48 and 50 into the pilot portion 52, whereupon he withdraws the latter from the bore B and proceeds to the measurement of the next workpiece W.

What I claim is:
1. An internal spacing measurement gauge for measuring the distance between axially-spaced shoulders within a bore, said gauge comprising
   an elongated hollow support having a dial indicator thereon, and having longitudinally-spaced parallel transverse forward and rearward bores therein remote from said dial indicator,
   forward and rearward measuring feelers reciprocably mounted in said forward and rearward bores respectively and having measuring tips projecting laterally from said support,
      one of said bores being enlarged in a direction longitudinally of said support and its respective feeler being movable in said enlarged bore parallel to the other feeler in a direction axially along said support,
   motion-transmitting means in said support disposed between and operatively connecting said parallel-movable feeler to said dial indicator,
   and means on said support for manually moving said parallel-movable feeler axially in spaced parallel relationship relatively to the other feeler whereby to vary the spacing of the tips of said feelers.
2. An internal spacing measurement gauge according to claim 1, wherein means is provided in said support for selectively retracting said feelers transversely of and into said support.
3. An internal spacing measurement gauge according to claim 1, wherein said motion-transmitting means includes a hollow member mounted in said support and engageable with said parallel-movable feeler and operatively connected to said dial indicator.
4. An internal spacing measurement gauge for measuring the distance between axially-spaced shoulders within a bore, said gauge comprising
   an elongated hollow support having a dial indicator thereon, and having longtudinally-spaced parallel transverse forward and rearward bores therein remote from said dial indicator,
   forward and rearward measuring feelers mounted in said forward and rearward bores respectively and having measuring tips projecting laterally from said support,
      one of said bores being enlarged in a direction longitudinally of said support and its respective feeler being movable parallel to the other feeler in a direction axially along said support,
   motion-transmitting means disposed between and operatively connecting said parallel-movable feeler to said dial indicator,
   and means for manually moving said parallel-movable feeler axially in spaced parallel relationship to the other feeler whereby to vary the spacing of the tips of said feelers,
      said motion-transmitting means including a hollow member engageable with said parallel-movable feeler and operatively connected to said dial indicator,
      means being provided within said hollow member for selectively retracting said feelers transversely of and into said support.
5. An internal spacing measurement gauge according to claim 4, wherein said retracting means includes feeler-retracting cam portions on said feelers and a longitudinally-movable structure having cam-actuating portions thereon selectively engageable with said feeler-retracting cam portions.
6. An internal spacing measurement gauge according to claim 5, wherein a rotary retracting element is rotatably mounted on said support and wherein mechanism is provided which is responsive to the rotation of said rotary retracting element for moving said structure longitudinally in a feeler-retracting direction.
7. An internal spacing measurement gauge according to claim 5, wherein feeler-advancing cam portions are also provided on said feelers and wherein said structure also includes cam-actuating portions selectively engageable with said feeler-advancing cam portions.
8. An internal spacing measurement gauge according to claim 7, wherein longitudinal motion of said structure in one direction actuates said feeler-retracting cam portions to retract said feelers and in the opposite direction actuates said feeler-advancing cam portions to extend said feelers.
9. An internal spacing measurement gauge according to claim 3, wherein there is additionally provided manual means on said support for selectively moving said hollow member in a direction away from said dial indicator.
10. An internal spacing measurement gauge according to claim 5, wherein said feelers have openings therein and wherein said structure includes a plurality of elongated motion-transmitting members operatively connected to one another through said openings.

References Cited
UNITED STATES PATENTS 2,749,620  6/1956  Czaplinski _____ 33—147
3,321,839  5/1967  Muller _____ 33—147 X SAMUEL S. MATTHEWS, *Primary Examiner.*